(12) United States Patent  
Kitagawa

(10) Patent No.: US 9,931,699 B2  
(45) Date of Patent: Apr. 3, 2018

(54) CUTTING TOOL HOLDER AND CUTTING TOOL

(71) Applicant: NGK SPARK PLUG CO., LTD., Nagoya-shi, Aichi (JP)

(72) Inventor: Shusuke Kitagawa, Kani (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 15/027,954

(22) PCT Filed: Sep. 5, 2014

(86) PCT No.: PCT/JP2014/073586  
§ 371 (c)(1),  
(2) Date: Apr. 7, 2016

(87) PCT Pub. No.: WO2015/056496  
PCT Pub. Date: Apr. 23, 2015

(65) Prior Publication Data  
US 2016/0236281 A1  Aug. 18, 2016

(30) Foreign Application Priority Data  
Oct. 18, 2013  (JP) .................................. 2013-217867

(51) Int. Cl.  
*B23B 27/10* (2006.01)  
*B23Q 11/10* (2006.01)  
(Continued)

(52) U.S. Cl.  
CPC ............ *B23B 27/10* (2013.01); *B23B 29/043* (2013.01); *B23B 2250/12* (2013.01); *B23C 5/28* (2013.01); *B23Q 11/10* (2013.01); *Y10T 407/14* (2015.01)

(58) Field of Classification Search  
CPC ... B23B 27/10; B23B 29/043; B23B 2205/02; B23B 51/06; Y10T 407/14; B23Q 11/10; B23C 5/28  
(Continued)

(56) References Cited

U.S. PATENT DOCUMENTS 3,808,656 A  *  5/1974  Lindskog ................ B23B 27/10  
407/11  
4,606,680 A  *  8/1986  Striegl .............. B23B 29/03421  
408/147

(Continued)

FOREIGN PATENT DOCUMENTS

CN        202984703 U      6/2013  
DE    112011016148 A1    10/2012  
(Continued)

OTHER PUBLICATIONS

Japan Patent Office, Office Action issued in corresponding Japanese Application No. 2015-508338, dated Oct. 25, 2016.  
(Continued)

*Primary Examiner* — Daniel Howell  
*Assistant Examiner* — Nicole N Ramos  
(74) *Attorney, Agent, or Firm* — Stites & Harbison, PLLC; Jeffrey A. Haeberlin

(57) ABSTRACT

A recess surface portion 123 is formed in a predetermined range L1 from a front end 103 toward a rear end, of a lateral flank 120 of a front end portion 102 of a holder 100, so as to be recessed relative to a lateral flank 120b of a rear portion 122, a circular arc surface portion (frontward-facing surface) 125 formed in a circular arc shape as seen from a rake face 105 side is provided on the rear of the recess surface portion 123, and an ejection port 150 is opened in the frontward-facing surface. Accordingly, supply of the coolant at the lateral flank side is ensured, and cutting can be performed at  
(Continued)

a position closer to a chuck Ck due to no protruding portion being present at the lateral flank side of the holder as in the conventional art.

3 Claims, 11 Drawing Sheets

(51) Int. Cl.
    *B23B 29/04*     (2006.01)
    *B23C 5/28*     (2006.01)

(58) Field of Classification Search
    USPC .......................................................... 407/11
    See application file for complete search history.

(56) References Cited

U.S. PATENT DOCUMENTS

| | | | |
|---|---|---|---|
| 5,709,508 A * | 1/1998 | Barazani | B23B 27/045 |
| | | | 407/101 |
| 5,829,331 A * | 11/1998 | Mori | B23B 27/10 |
| | | | 407/11 |
| 5,833,403 A * | 11/1998 | Barazani | B23B 27/007 |
| | | | 407/101 |
| 8,021,087 B2 | 9/2011 | Choi et al. | |
| 9,205,495 B2 | 12/2015 | Fujii et al. | |
| 2007/0059110 A1 | 3/2007 | Choi et al. | |
| 2007/0081867 A1* | 4/2007 | Murakami | B23B 27/007 |
| | | | 407/11 |
| 2010/0119314 A1 | 5/2010 | Nagaya et al. | |
| 2013/0129437 A1 | 5/2013 | Sevdic et al. | |
| 2014/0030033 A1* | 1/2014 | Luik | B23B 27/10 |
| | | | 407/11 |
| 2014/0290450 A1 | 10/2014 | Fujii et al. | |
| 2016/0175942 A1 | 6/2016 | Sevdic et al. | |

FOREIGN PATENT DOCUMENTS

| | | |
|---|---|---|
| EP | 2 140 959 A1 | 1/2010 |
| JP | S54-001475 A | 1/1979 |
| JP | S63-030402 U | 2/1988 |
| JP | H05-088805 U | 12/1993 |
| JP | H07-17403 U | 3/1995 |
| JP | H08-25110 A | 1/1996 |
| JP | H08-71813 A | 3/1996 |
| JP | 2001-287103 A | 10/2001 |
| JP | 2006-524582 A | 11/2006 |
| JP | 2007-075933 A | 3/2007 |
| JP | 2009-125848 A | 6/2009 |
| JP | 2010-105084 A | 5/2010 |
| JP | 2011-5618 A | 1/2011 |
| JP | 2013-532589 A | 8/2013 |
| WO | 2012/117791 A1 | 9/2012 |
| WO | WO 2012130857 A1 * | 10/2012 ............. B23B 27/10 |

OTHER PUBLICATIONS

Japan Patent Office, International Search Report issued in International Stage of subject Application No. PCT/JP2014/073586, dated Dec. 2, 2014.

Japan Patent Office, Notification of Reasons for Refusal, issued in corresponding Japanese Application No. 2015-508338, dated May 17, 2016.

European Patent Office, Supplementary European Search Report issued in corresponding Application No. EP 14 85 4496, dated May 9, 2017.

\* cited by examiner

CUTTING TOOL HOLDER AND CUTTING TOOL

TECHNICAL FIELD

The present invention relates to a cutting tool holder used for, for example, outer diameter processing of a to-be cut object (workpiece) by turning, and a cutting tool formed by fixing a cutting tip to a tip seat at a front end of the cutting tool holder.

BACKGROUND ART

Conventionally, as such a type of a cutting tool, various cutting tools have been proposed in which a flow path is provided within a cutting tool holder (hereinafter, also referred to merely as holder) in order to supply a coolant to a cutting edge of a cutting tip (an cutting insert such as a throw-away tip) in a pouring manner. Such a cutting tool is configured such that an ejection port connected to the flow path is opened near the front end of the holder to supply a coolant (a cutting fluid, etc.) fed under pressure within the flow path, as a high-pressure jet flow toward a rake face etc. forming the cutting edge. Among such cutting tools, there is a technique in which the ejection port is provided in the cutting tool holder (main body) and at the side of a lateral flank forming the cutting edge such that the coolant can be jetted out toward the lateral flank (Patent Document 1, Patent Document 2). In the cutting tool configured such that the coolant is ejected from such an ejection port, in addition to cooling of the cutting edge (knife edge) and a to-be cut object (temperature rise prevention) by the coolant, the effect of lubrication is high, and this configuration is also effective for prevention of flank wear. Moreover, this configuration is effective for treatment of swarf, for example, an effect of blowing swarf at the lateral flank side is also obtained, and thus an effect of preventing swarf from being tangled with the cutting tool or damaging a machined surface is obtained. In the present application, a "lateral flank" regarding the cutting tool holder means a side surface facing in the same direction as a lateral flank of a cutting tip fixed to the holder, and a "rake face" regarding the cutting tool holder means a surface facing in the same direction as a rake face of the cutting tip fixed to the holder.

Incidentally, conventionally, in the case of processing a to-be cut object with high accuracy by turning, a cutting tool 2 should be used at a position that is as close to a spindle head of a lathe or a claw for chucking the to-be cut object as possible. In particular, in precision processing of a to-be cut object (round bar) having a small diameter, this demand is high from the standpoint of prevention of runout. Meanwhile, in the case where a to-be cut object is a predetermined shaft or a pin-like component and is to be efficiently processed, a lathe (automatic lathe) is used which is equipped with an automatic material feed device configured such that a material to be processed (a long bar material) is passed within a rotating hollow spindle (main shaft), and is automatically sent out by a required length each time predetermined processing ends, so that the next processing can be performed. In such a lathe, a plurality of cutting tools (cutting tools for outer diameter processing and groove formation) required for processing the component, which is a to-be cut object, are fixed to a tool rest, for example, above a spindle (rotation shaft) in a comb teeth-like arrangement so as to be spaced apart from each other in a direction perpendicular to the rotation shaft and parallel to each other. Processing is carried out as follows: in accordance with cutting, the tool rest is moved in the perpendicular direction, traversing feed of the tool rest (movement in the radial direction of the rotation shaft (e.g., in the downward direction) is performed for performing cutting with a cutting tool selected per processing, and cross feed (feed in the direction along the rotation shaft) is performed as automatic feed at the material side.

As described above, in turning with the automatic lathe in which cross feed (feed in the direction along the rotation shaft) is performed as automatic feed at the to-be cut object side, the tool rest itself is provided near the front of the spindle head (or the claw of a chuck) in the direction along the rotation shaft, and thus the cutting tools for outer diameter processing and the like are necessarily disposed with a small gap maintained to such an extent as not to interfere with the front of the spindle head. Each cutting tool is mounted on the tool rest such that the lateral flank of the cutting tool holder (shank) forming the cutting tool and a cutting edge corner of a cutting tip provided to the cutting tool are located as close to the spindle head (or the claw of the chuck) as possible. The same applies to the case of using a cutting tool having, at the lateral flank side, an ejection port for ejecting the coolant toward the cutting edge, as in the cutting tool holder of the cutting tool described above.

PRIOR ART DOCUMENT

Patent Document

Patent Document 1: Japanese Patent Publication Laid-Open (kokai) No. H08-25110
Patent Document 2: Japanese Patent Publication Laid-Open (kokai) No. H08-71813

SUMMARY OF THE INVENTION

Problem to be Solved by the Invention

However, in the cutting tool in the conventional art described above, the ejection port for supplying the coolant to the lateral flank of the cutting edge of the cutting tip is provided so as to be opened in a frontward-facing surface of a protruding portion, such as an adapter, or a projecting portion provided at the lateral flank side of the cutting tool holder so as to project in a bulging manner. That is, in the conventional cutting tool described above, the protruding portion for providing the coolant ejection port is provided at the lateral flank side in the holder in a projecting manner. Thus, due to the projection, when the cutting tool is used, the cutting tool cannot be moved close to the front of the spindle head (or the claw of the chuck), and is rather moved away therefrom further by a distance corresponding to the protruding portion. As described above, in such a type of a conventional cutting tool, supply of the coolant at the lateral flank side is ensured, but the cutting tool is fixed to the tool rest so as to be spaced apart from the spindle head or the claw of the chuck further by the distance corresponding to the protruding portion, that is, the protrusion, for providing the ejection port. Thus, there is a problem that cutting is carried at a position further away from the chuck due to this spacing. Such a problem may cause runout or the like in ultra-high precision finishing of a shaft member having a small diameter, and thus is easily revealed. However, if a member for preventing runout is additionally provided, the processing efficiency decreases.

Such a problem means to arise over the entire cutting process in the automatic lathe including the tool rest that fixes a plurality of cutting tools in a comb teeth-like arrangement at the same position as the to-be cut object in the direction along the rotation shaft as described above, since the other cutting tool is disposed at a position away similarly to the cutting tool including the above protruding portion for the ejection port. In addition, regarding such a problem, in the case where cross feed of the tool rest having the cutting tool fixed thereto is performed such that processing is performed to a position near the chuck in order to perform outer diameter processing with a general lathe that does not include an automatic material feed device, the cutting edge cannot be close to the chuck due to the presence of the protruding portion (protrusion) as compared to the case where such a protruding portion is not provided.

The present invention has been made in view of the above-described problems, and an object of the present invention is to provide a cutting tool holder that allows a coolant to be supplied toward a cutting edge at a lateral flank side of a cutting tip, without providing a protruding portion at a lateral flank side of the cutting tool holder as in a conventional cutting tool, and a cutting tool that allows cutting to be performed at a position closer to a spindle head or a chuck than with the conventional cutting tool, while supply of the coolant is ensured.

Means for Solving the Problem

The invention according to claim 1 is a cutting tool holder including: a tip seat, provided in a front end portion of the cutting tool holder, for fixing a cutting tip thereto; and an ejection port opened such that a coolant can be supplied from a lateral flank side of the cutting tip toward a cutting edge of the cutting tip fixed to the tip seat, the ejection port being provided at a lateral flank side of the cutting tool holder, wherein a recess surface portion is formed in a predetermined range from a front end toward a rear end, of the lateral flank of the front end portion of the cutting tool holder, so as to be recessed relative to a lateral flank of a rear portion rearward of the predetermined range, and the ejection port is provided in a frontward-facing surface in the recess surface portion.

The invention according to claim 2 is a cutting tool holder according to claim 1, wherein the ejection port is opened such that, when the cutting tip is fixed to the tip seat, the ejection port is located at a position lower than a rake face of the cutting tip and the coolant is ejected obliquely upward. The invention according to claim 3 is a cutting tool holder according to claim 1 or 2, wherein a plurality of the ejection ports are provided in an up-down direction.

The invention according to claim 4 is a cutting tool including: the cutting tool holder according to any one of claims 1 to 3; and the cutting tip fixed to the tip seat of the cutting tool holder, wherein, when seen from a rake face side, the cutting tip does not project from a virtual straight line that is drawn along the lateral flank of the rear portion in the cutting tool holder.

Advantageous Effects of the Invention

In the cutting tool holder according to the present invention, as configured above, the recess surface portion is formed in the predetermined range from the front end toward the rear end, of the lateral flank of the front end portion of the cutting tool holder, so as to be recessed relative to the lateral flank of the rear portion rearward of the predetermined range, and the ejection port is provided in the frontward-facing surface in the recess surface portion. Thus, in the case where a cutting tool is made by fixing the cutting tip to the tip seat and fixed to a tool rest of a lathe and outer diameter processing or end face processing of a to-be cut object is performed, the coolant can be supplied from the lateral flank side toward the cutting edge of the cutting tip. In the cutting tool, the ejection port is not provided in a protruding portion (protrusion), such as an adapter, or a projecting portion provided at the lateral flank side of the cutting tool holder as in a conventional cutting tool, and reversely to this, that is, in the present invention, without providing such a protruding portion, the ejection port is provided in the frontward-facing surface in the recess surface portion provided at the lateral flank side of the front end portion of the holder. Since, as described above, the holder of the present invention does not have, at the lateral flank side, a protrusion such as the "protruding portion" as in the conventional cutting tool, when a cutting tool including the holder is fixed to a tool rest of an automatic lathe or the like and outer diameter processing is performed, the processing can be performed such that the cutting edge of the cutting tool is disposed more closely to a spindle head or the claw of a chuck due to absence of such a "protruding portion" as in the conventional cutting tool. Thus, while supply of the coolant to the lateral flank side is ensured, a problem such as runout can be reduced even if the to-be cut object has a small diameter, as compared to the case of using the conventional cutting tool. Thus, efficient and high-precision processing can be achieved.

In the holder of the present invention, as the front-rear region in which the recess surface portion is formed increases, a cut-in depth can be increased, so that the holder is also suitable for processing of an end face of a to-be cut object having a large diameter. Therefore, it can be preferred if the front-rear region in which the recess surface portion is formed is larger than a front-rear portion opened at the lateral flank side, of the tip seat. However, if merely outer diameter processing is performed and the cut-in depth (cut-in amount) is small so that there is also no problem about swarf dischargeability, the front-rear region in which the recess surface portion is formed may be smaller than the portion opened at the lateral flank side, of the tip seat.

The "frontward-facing surface" in the recess surface portion of the cutting tool holder of the present invention only needs to be a surface in which the ejection port from which the coolant can be ejected toward the front end side can be opened. Therefore, the "frontward-facing surface" is not limited to a surface that can be seen when a front end of the holder is seen with the front end as a front surface, of the recess surface portion, and is a rear end surface facing the front end side or a surface close to a rear end, in the recess surface portion. More specifically, for example, if the rear end of the recess surface portion forms a flat surface perpendicular to the front-rear direction of the holder, the frontward-facing surface is the flat surface, that is, a flat surface facing the front end. In addition, if the rear end of the recess surface portion forms a flat surface that is not perpendicular to the front-rear direction of the holder when seen from the rake face side, the frontward-facing surface is the flat surface, and the flat surface is inclined relative to the front-rear direction of the holder when seen from the rake face side. Furthermore, if a portion close to the rear end and including the rear end of the recess surface portion forms a curved line or a circular arc-shaped line forming a recess when seen from the rake face side, the frontward-facing surface is the surface including the curved line.

In the case where the ejection port is provided as in the present invention according to claim 2, an external force is applied by the coolant ejected therefrom, in a direction in which swarf is moved upward from the rake face. Thus, an effect of preventing swarf from being tangled with the cutting tool is obtained. Meanwhile, a plurality of the ejection ports may be provided as in the present invention according to claim 3. In the case of obtaining a cutting tool by fixing the cutting tip to the tip seat, as recited in claim 4, the cutting tip may be fixed such that, when seen from the rake face side, the cutting tip, that is, a cutting edge thereof, does not project from the virtual straight line that is drawn along the lateral flank in the rear portion of the cutting tool holder.

MODES FOR CARRYING OUT THE INVENTION

Figure 1:
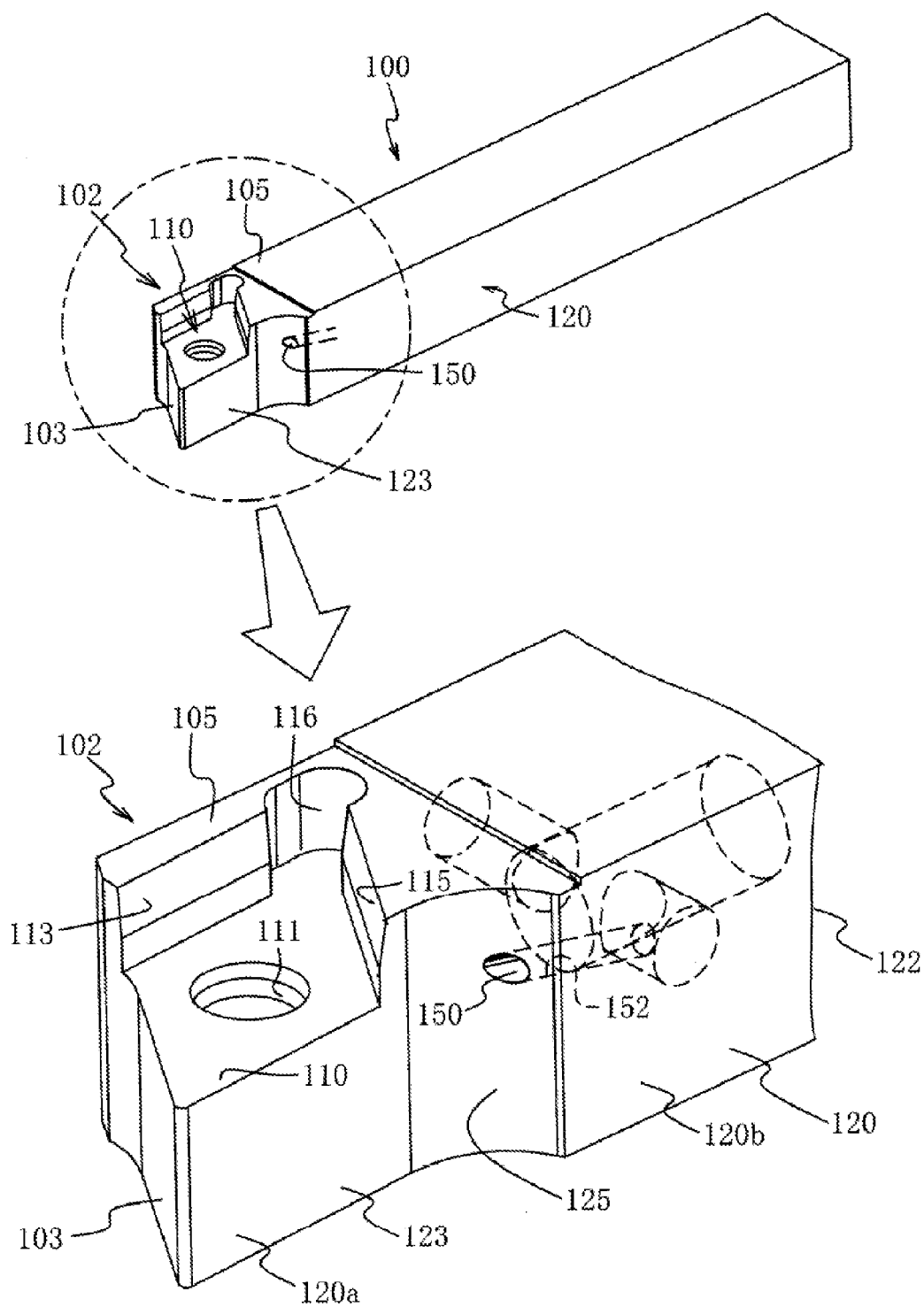
FIG. 1 Perspective view of embodiment 1 of the cutting tool holder of the present invention, and an enlarged view of a main part thereof.

An embodiment of the cutting tool holder of the present invention will be described in detail based on FIGS. 1 to 4. In the drawings, reference numeral 100 denotes a cutting tool holder that is formed with, as a base material (base), a bar material (quadrilateral bar material) having a certain quadrilateral (rectangular) transverse cross-section and extending in a front-rear direction, and a tip seat 110 for seating a cutting tip (see FIG. 5. In this example, a rhomboidal tip having two corners. Hereinafter, also referred to as a cutting tip 200) thereon and fixing (hereinafter, screwing) the cutting tip by a screwing method is recessed in an upper surface 105 (a surface facing in the same direction as a rake face. Hereinafter, also referred to as rake face) of a front end portion 102 of the cutting tool holder 100. However, in the cutting tool holder 100, of a lateral flank 120 side, a lateral flank 120a in a predetermined range L1 (see an enlarged view in FIG. 2) from a front end toward a rear end forms a recess surface portion 123 recessed along the front-rear direction from a lateral flank 120b (hereinafter, also referred to as reference surface) of a rear portion 122 rearward of the range L1. Of the recess surface portion 123, the contour of the recess surface portion 123 as seen from the rake face 105 side, that is, the end edge of the tip seat 110 at the lateral flank side, is formed such that a portion thereof close to the front end thereof, including the front end, corresponds to the shape of a lateral flank 210 (the shape of a cutting edge 215) forming one side of the cutting tip (rhomboidal tip) 200 to be fixed (see FIG. 2), although the details will be described later. Thus, in this example, when the rhomboidal tip forming the cutting tip 200 is seen from the rake face 105 side, the recess surface portion 123 has a rake angle (back rake) of about 3 degrees at which the recessed amount of the recess surface portion 123 increases as distance to the rear end decreases such that an acute corner that is located at the front end of the rhomboidal tip and serves to cut projects toward the lateral flank 120 side of the holder 100 by an appropriate amount, and the recess surface portion 123 forms a straight line in a predetermined range from the front end toward the rear end.

Thus, in the holder 100, when the recess surface portion 123 is seen from the rake face 105 side, the width dimension of the front end portion 102 of the holder 100 which is the region L1 in which the recess surface portion 123 is formed is smaller than that of the rear portion 122. However, of the recess surface portion 123, a portion close to the rear end forms a circular arc surface portion 125 having a circular arc shape and recessed as seen from the rake face 105 side, and the lateral flank 120b of the rear portion 122 connected thereto via the circular arc surface portion 125 is relatively wide. Although the details will be described later, a coolant ejection port (hole) 150 is opened in a portion having a height equal to the height of the tip seat (seating face) 110, of the circular arc surface portion 125. The ejection port 150 is formed such that a coolant that is fed under pressure within a flow path for coolant supply that is provided within the holder 100 in a tunnel shape can be supplied to the cutting edge 215 or its front end (knife edge corner) 217 at the lateral flank 210 side of the cutting tip 200 fixed to the tip seat 110.

Meanwhile, in this example, the tip seat 110 is formed within the front-rear region L1 in which the recess surface portion 123 is formed, of the front-rear area of the cutting tool holder 100. In this example, the tip seat 110 is recessed such that: the lateral flank 120 side and a front end 103 side are opened in the front-rear region L1 in which the recess surface portion 123 is formed; and the tip seat 110 is formed in a substantially rhomboid shape in a plan view (when seen from the rake face side). Because of the recessing, the tip seat 110 is formed such that, as seen from the rake face 105 side, two sides of the rhomboidal tip are restrained, with respect to the direction in which the cutting tool holder 100 extends frontward and rearward, by: a restraining wall 113 at the back surface side (the side opposite to the lateral flank 120 side) provided so as to be inclined at about 3 degrees such that the front end side thereof is directed toward the lateral flank 120 side; and a frontward-facing restraining wall surface 115 that intersects the restraining wall 113 at an acute angle and is directed obliquely toward the front end. The tip seat (seating face) 110 forms a rhomboid-shaped flat surface having, as end edges, a front end 103 side edge and a recess surface portion 123 side edge opened so as to face the lateral flank 120 side. The height (wall height) of each of the restraining wall surfaces 113 and 115 from the tip seat 110 is set so as to be substantially equal to the thickness of the cutting tip 200 to be fixed or smaller than the thickness of the cutting tip 200 by a small amount. However, in this example, the cutting tip 200 to be fixed is of a positive type, and thus each wall surface that actually restrains the flank is an inclined wall extending upward. In addition, of the frontward-facing restraining wall surface 115, the end edge at the lateral flank 120 side is formed so as to be located at the front end 103 side with respect to the circular arc surface portion 125 when seen from the rake face 105 side. The tip seat 110 has, at substantially the center thereof, a screw hole 111 for fixing the cutting tip 200 (a tip with a hole) by means of a setscrew 250. In addition, a recess (relief) 116 for releasing an acute corner of the rhomboidal tip 200 is provided at the intersection portion of both restraining wall surfaces 113 and 115 as seen from the rake face 105 side.

Figure 2:
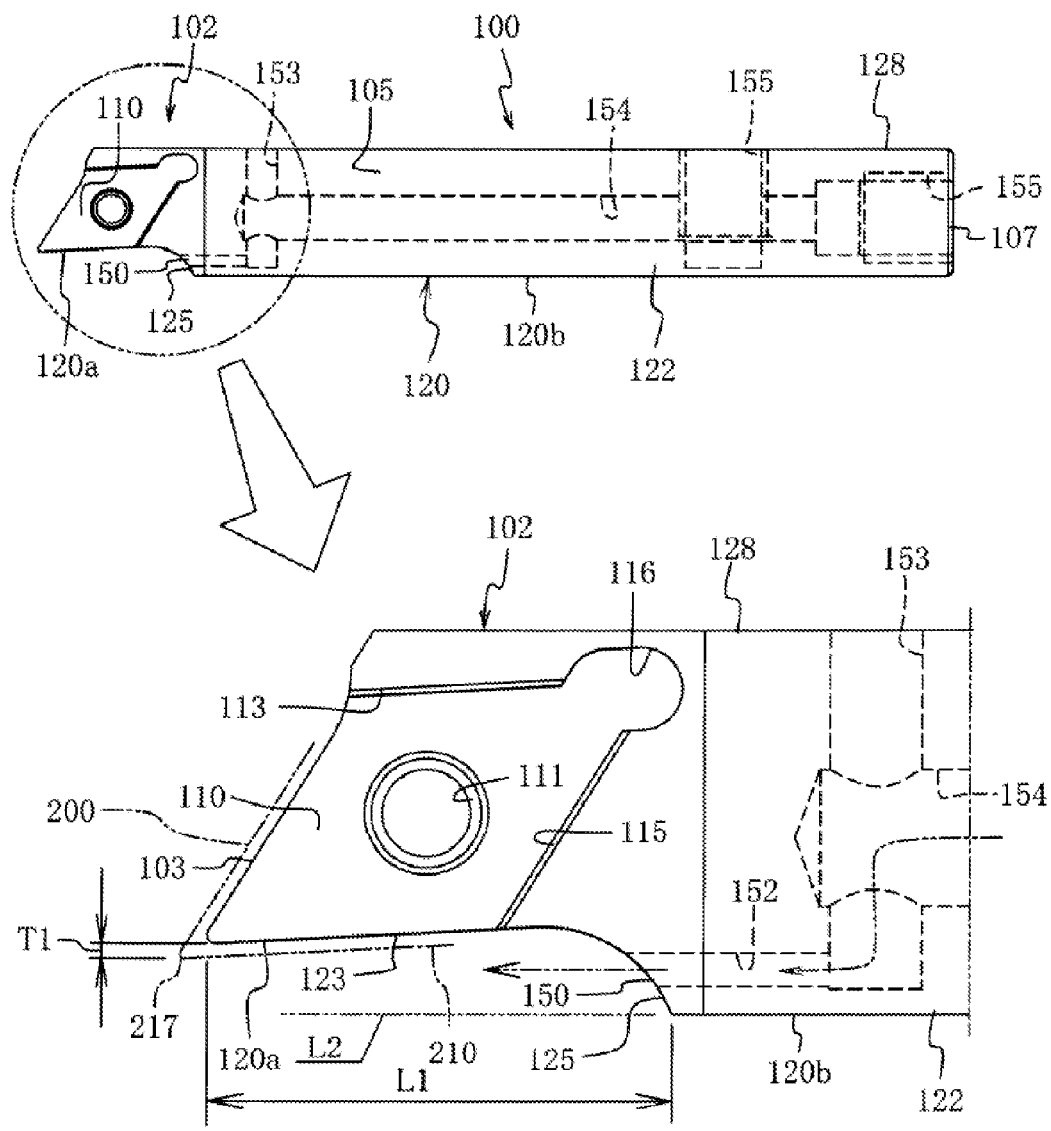
FIG. 2 View of the cutting tool holder in FIG. 1 as seen from a rake face side, and an enlarged view of a main part thereof.
Figure 5:
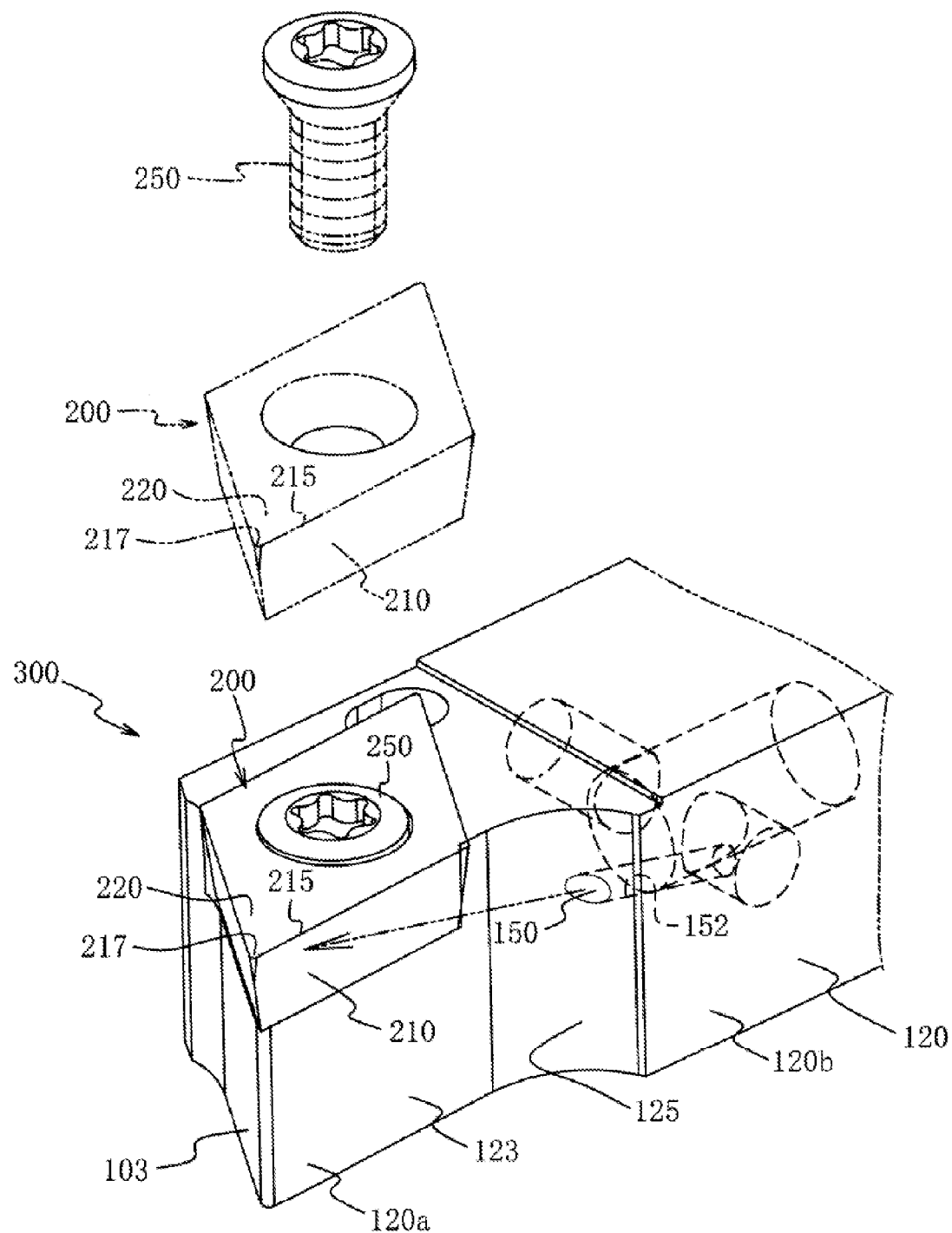
FIG. 5 Enlarged perspective view of a front end portion (main part) of a cutting tool formed by fixing a cutting tip to a tip seat of the cutting tool holder in FIG. 1.

In such a cutting tool holder 100 of this example, as shown in FIG. 5, when the rhomboid-shaped cutting tip 200 is seated on the tip seat 110 and fastened by means of the setscrew 250, the cutting edge corner (knife edge) 217 which projects frontward from the tip seat 110 at the front end 103 of the cutting tool holder 100 is set so as to project from the recess surface portion 123 of the holder 100 toward the lateral flank 120 side of the holder 100 by an appropriate amount T1 (see the enlarged view in FIG. 2). However, the projection amount T1 of the cutting edge corner 217 toward the lateral flank 120 side of the holder 100 is within the region of the recess surface portion 123 when seen from the rake face side. That is, the cutting edge corner 217 is set so as not to project outward of a straight line (virtual straight line) L2 that is drawn along the lateral flank (reference surface) 120b of the rear portion 122 rearward of the recess surface portion 123 in the cutting tool holder 100, when seen from the rake face 105 side.

In the cutting tool holder 100 of this example, as also described above, the coolant ejection port (hole) 150 is opened in the portion having a height equal to the height of the tip seat 110 (the flat surface of the seating face), of the circular arc surface portion (a frontward-facing surface in the present invention) 125 that is located at a rear end of the recess surface portion 123 or in a portion close to the rear end of the recess surface portion 123 and forms a frontward-facing surface. The ejection port 150 is a front end of a nozzle-like hole 152 having a circular transverse cross-section. The nozzle-like hole 152 is formed such that, when seen from the rake face 105 side (see FIG. 2), the axial line thereof (the axial line of the hole) passes through the vicinity of the front end of the lateral flank 210 (a portion close to the cutting edge corner 217) in the cutting tip 200 fixed to the tip seat 110, at the lateral flank 210 side of the cutting tip 200 (see the enlarged view in FIG. 2, and FIG. 6). The axial line seen from the rake face 105 side is provided so as to be parallel to a line (e.g., the virtual straight line L2) extending in the front-rear direction of the holder 100 in this example, but may be inclined at an appropriate inclined angle on the basis of the positional relationship between the position of the ejection port 150 seen from the rake face side and the front end (cutting edge corner 217) of the lateral flank 210, which serves to cut, of the cutting tip 200 fixed to the tip seat 110. The axial line of the nozzle-like hole 152 seen from the lateral flank 210 side in the cutting tip 200 (see FIG. 3) forms a straight line that is inclined upward so as to extend toward a portion, close to the rake face 220, of the front end (cutting edge corner 217) of the cutting edge 215, which serves to cut, of the cutting tip 200. This is because the ejection port 150 is formed at the same level (the same height) as the tip seat 110 in this example. However, for example, if the ejection port 150 is opened at the same height as the rake face 220 of the cutting tip 200, the axial line of the nozzle-like hole 152 may be provided so as to be parallel to the rake face of the holder 100. In addition, the ejection port 150 may be opened at a position higher than the rake face 220 of the cutting tip 200. In this case, reversely to the above, the axial line of the nozzle-like hole 152 is a straight line that is inclined downward so as to extend toward the portion, close to the rake face 220, of the cutting edge corner 217 which is the front end of the cutting edge 215, which serves to cut, of the cutting tip 200.

Figure 3:
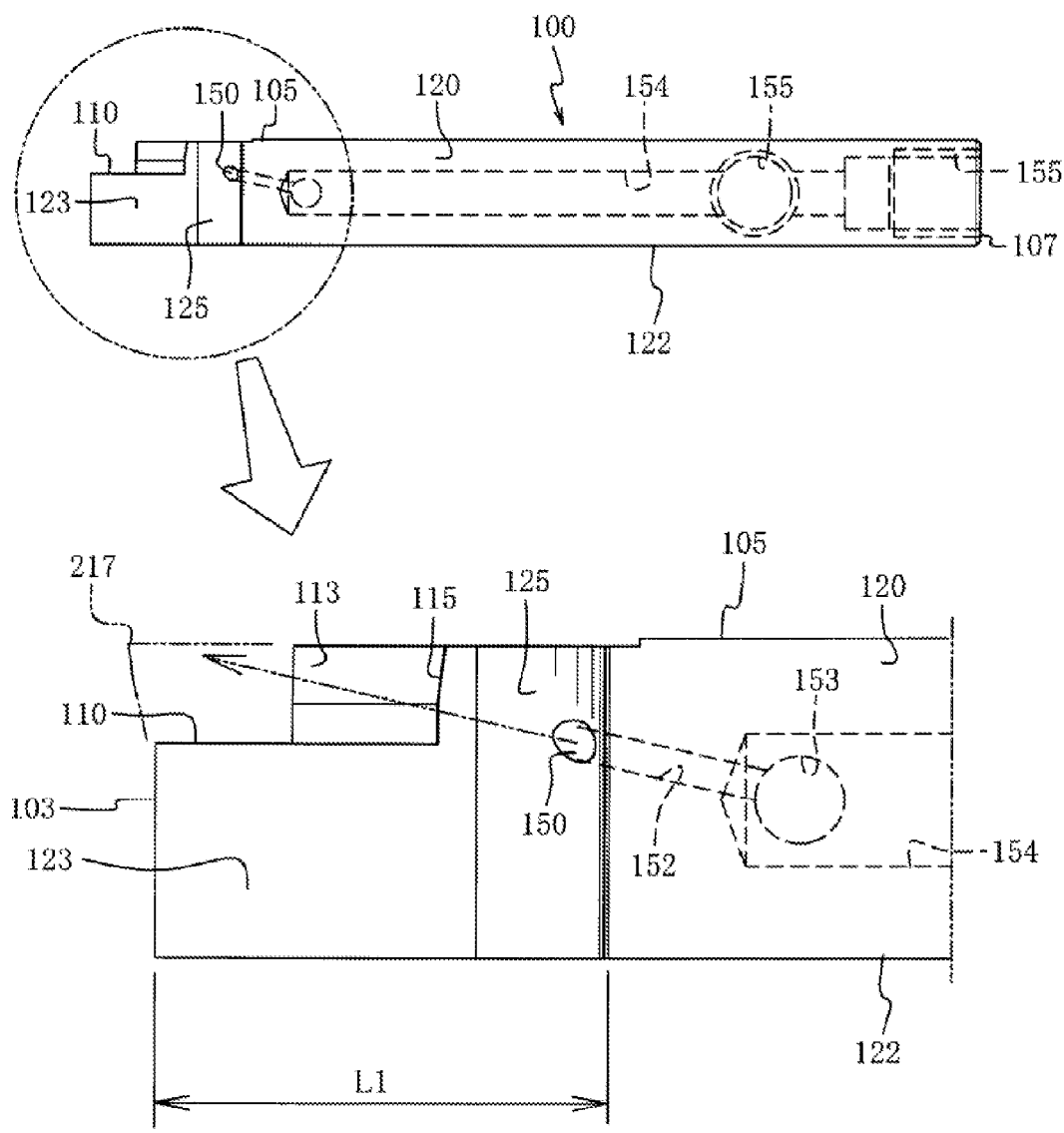
FIG. 3 View of the cutting tool holder in FIG. 1 as seen from a lateral flank side, and an enlarged view of a main part thereof.
Figure 4:
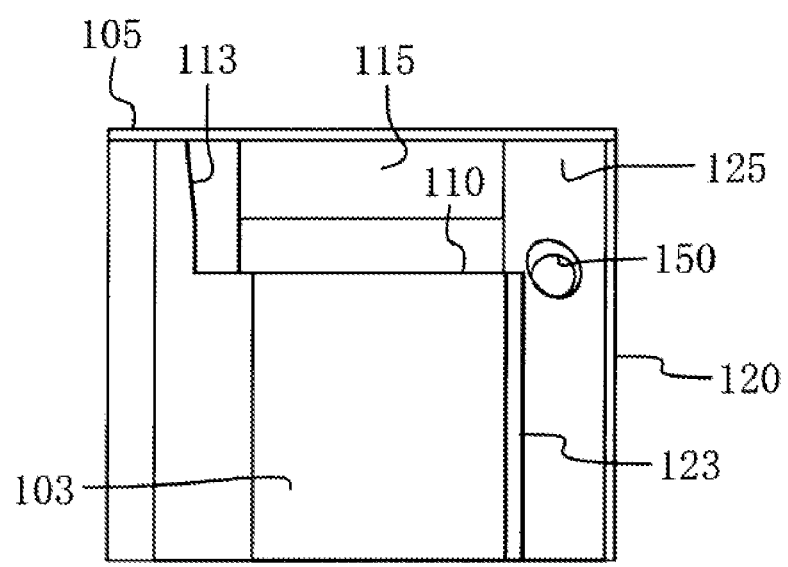
FIG. 4 Enlarged view of the cutting tool holder in FIG. 1 as seen from a front end thereof.

Meanwhile, the flow path for ejecting the coolant from the ejection port 150 is formed as follows (see FIGS. 2 to 4). Specifically, in this example, a main flow path 154 for coolant supply is formed within the holder 100 in a tunnel shape so as to have, as a central axis, an axis extending in the front-rear direction of the holder 100 from the rear end surface 107 of the cutting tool holder 100 toward the front end 103. The main flow path 154 forms a blind hole having a front end closed at the rear of the tip seat 110, and a branch flow path 153 composed of a blind hole formed laterally from a surface 128 at the side opposite to the lateral flank 120 in this example so as to communicate with the nozzle-like hole 152 connected to the opening of the above-described ejection port 150 is formed in a portion, close to the front end, of the main flow path 154. Thus, in the holder 100 of this example, as shown by arrows in the enlarged view in FIG. 2, the coolant fed under pressure from the outside to the main flow path 154 passes through the branch flow path 153 and the nozzle-like hole 152 and is ejected in a jet flow manner from the ejection port 150 in the direction along the above-described axial line. In this example, coolant pipe connection ports (pipe connection thread portions) 155 are provided in the rear end surface 107 of the cutting tool holder 100 and the one side surface 128 at the side opposite to the lateral flank 120 side, respectively, so as to communicate with each other and such that the connection port is selectable. The connection that is not used may be closed by screwing a plug thereinto. The opening end of the branch flow path 153 is also closed, for example, by a plug being screwed thereinto, although not shown.

Figure 6:
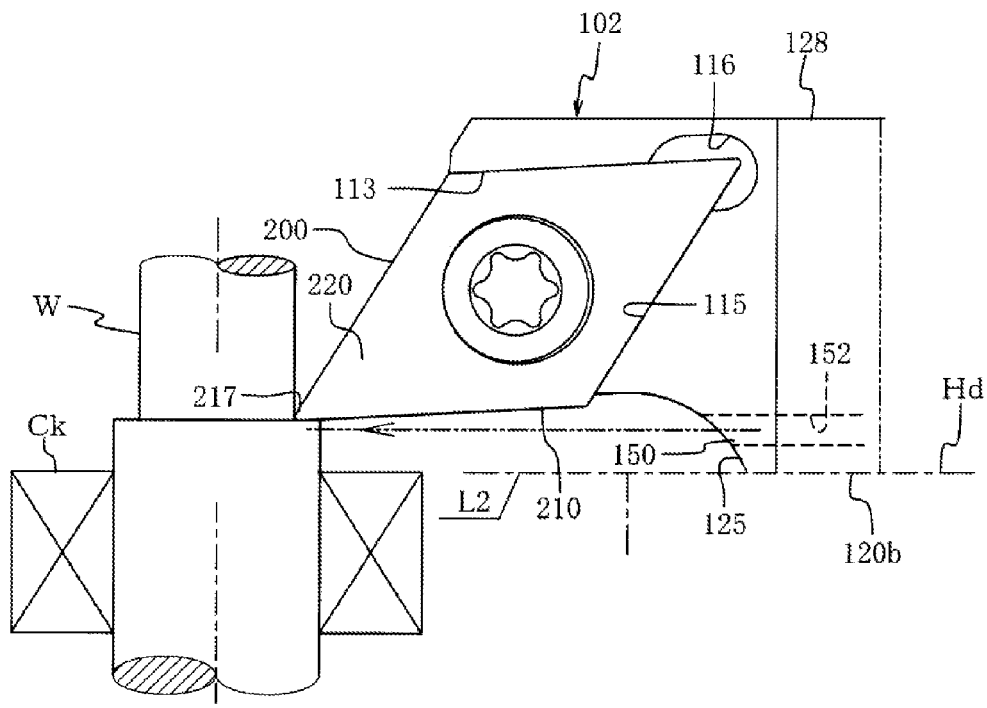
FIG. 6 Enlarged view of a main part as seen from the rake face side, illustrating a positional relationship among a lateral flank of the cutting tool holder, a cutting edge of the cutting tool, and tips of a chuck when a to-be cut object is cut with the cutting tool in FIG. 5 near the chuck.
Figure 7:
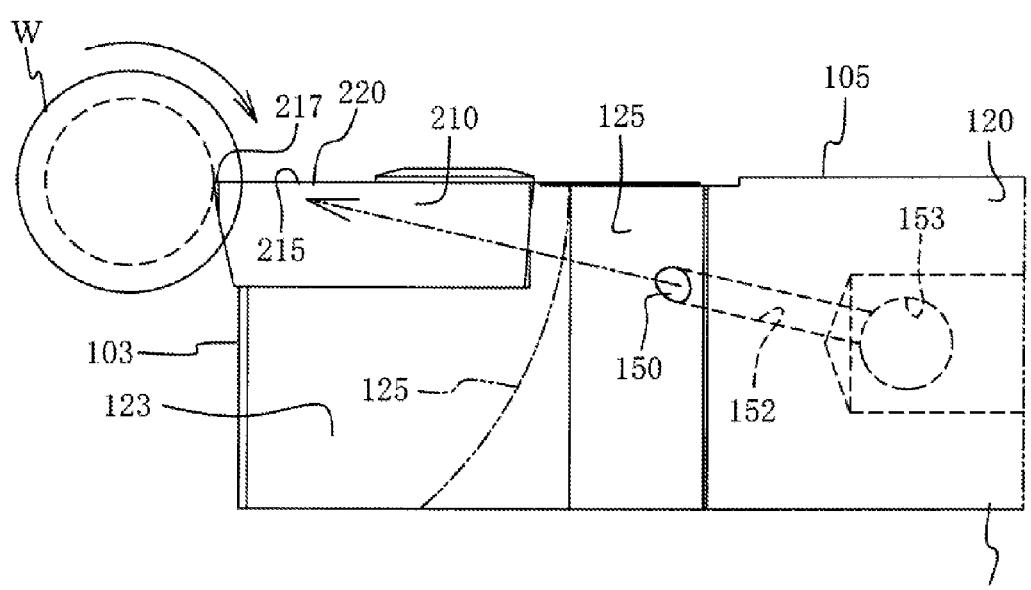
FIG. 7 View of FIG. 6 as seen from the lateral flank side.
Figure 8:
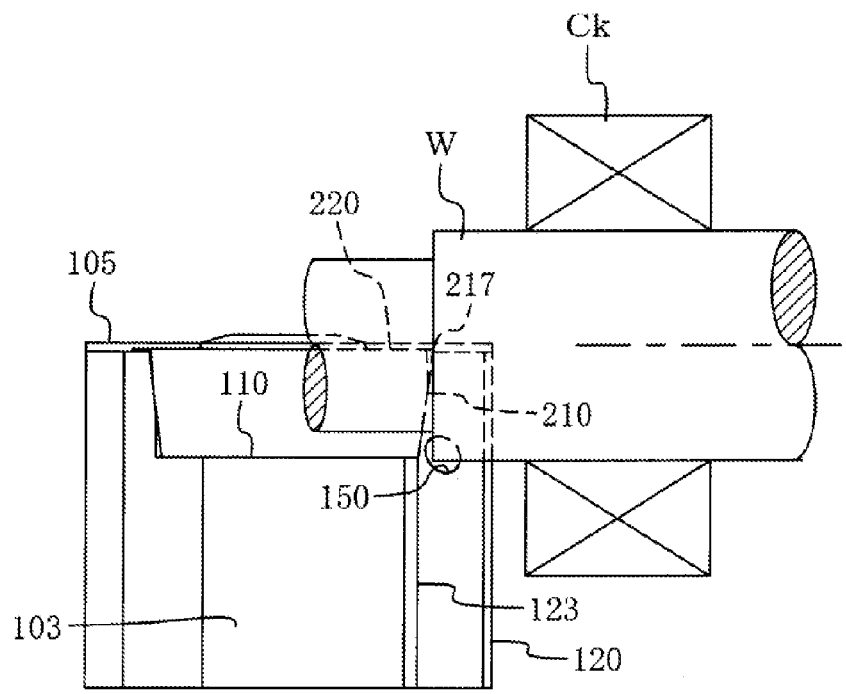
FIG. 8 View of FIG. 6 as seen from the front end of the cutting tool.

Thus, according to the above-described cutting tool holder 100 of this example, by fixing the predetermined cutting tip 200 to the tip seat 110 by the screwing method as described above, the cutting tool 300 is obtained as shown in FIGS. 5 and 6, etc. When the cutting tool 300 is fixed to the tool rest Hd of the lathe and, for example, outer diameter processing of a to-be cut object (round bar) W retained (fixed) by a chuck Ck is performed, a predetermined pipe is connected to the coolant pipe connection port 155, and the coolant is fed under pressure, whereby the coolant can be supplied in a jet flow state to the above-described cutting part. That is, in this example, since the coolant ejection port 150 is provided in the frontward-facing surface formed by the circular arc surface portion 125 (also referred to as frontward-facing surface 125) in the cutting tool holder 100 as described above, the coolant can be supplied in a desired form from the lateral flank 120 side toward the cutting edge corner 217 of the cutting edge 215, which serves to cut, in a cutting process for the cutting part. Accordingly, not only lubrication between the cutting edge (knife edge) 215 and the to-be cut object W and cooling of both can be obtained, but also an effect of separating generated swarf from the cutting part in the set ejection direction is obtained. Thus, effective swarf treatment performance is obtained. The coolant is ejected obliquely upward toward the rake face 220 side as shown in FIG. 7, and is supplied to the gap between the to-be cut object W and the flank 210 forming a positive rake angle below the rake face 220 of the cutting tip 200 as shown in FIG. 8.

What is important in the cutting tool 300 of this example is that the ejection port 150 is not provided in a protruding portion, such as an adapter, or a projecting portion provided at the lateral flank side of the cutting tool holder as in a conventional cutting tool, and, completely reversely to this, without providing such a protruding portion, the ejection port 150 is opened in the circular arc surface portion 125 that forms a frontward-facing surface on the rear of the recess surface portion 123 provided at the lateral flank 120 side of the front end portion 102 of the holder 100. That is, the cutting tool 300 of this example does not have a protruding portion that is for forming an ejection port and is provided so as to protrude to the lateral flank side of the holder as in the conventional cutting tool. Thus, in turning using the cutting tool 300 of this example, as shown in FIG. 6, the reference surface 120b of the cutting tool holder 100 can be closer to the chuck (or spindle head) Ck of the lathe than in the case with the conventional cutting tool, since there is no protruding portion. Accordingly, processing of the to-be cut object W can be performed at a position closer to the chuck Ck, and thus, also in processing of a round bar having a small diameter, efficient and high-precision processing can be performed without a problem due to runout or the like. That is, in the case where only traversing feed (feed in a cut-in direction) of the cutting tool is performed as in processing with an automatic lathe including an automatic material feed device, the effect is exerted on other cutting tools since the other cutting tools are fixed to the same tool rest in an comb teeth-like arrangement, so that a remarkable effect is obtained.

Figure 9:
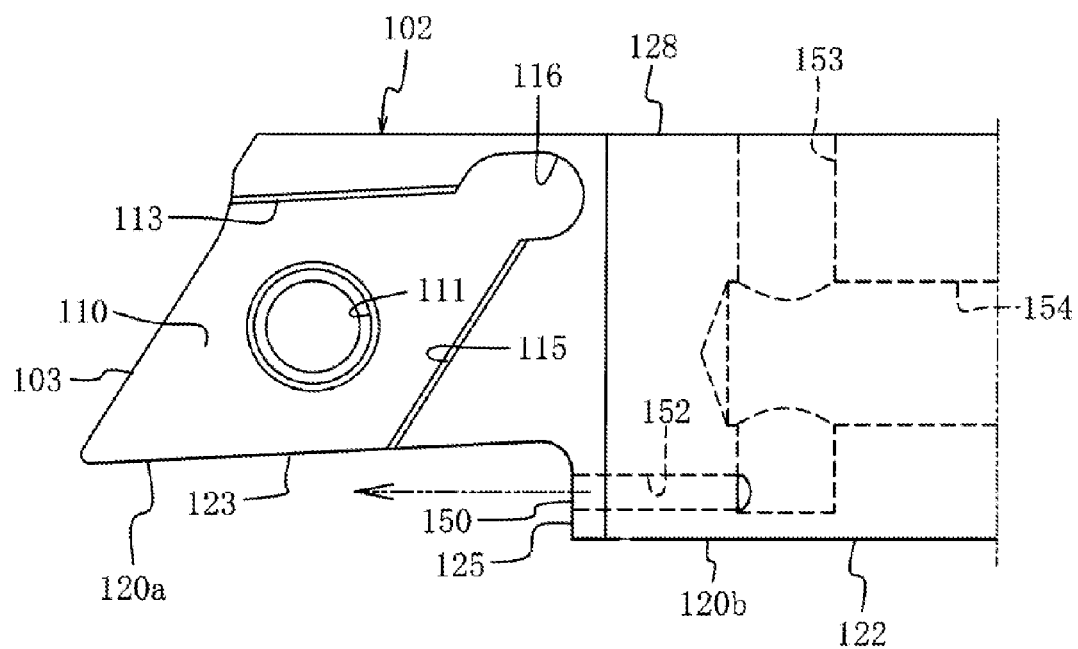
FIG. 9 Enlarged view of a main part of the cutting tool holder as seen from the rake face side, illustrating another example of a frontward-facing surface on the rear of a recess surface portion in which surface an ejection port is opened.

In the above-described cutting tool holder 100 of the example, the frontward-facing surface that faces frontward at the rear end of the recess surface portion 123 is the circular arc surface portion 125. Meanwhile, in the invention of the present application, although obvious from the above, the "frontward-facing surface" in the recess surface portion 123 only needs to be a surface (portion) in which the ejection port 150 from which the coolant can be ejected toward the front of the holder 100 can be opened. Therefore, as also described above, although the frontward-facing surface 125 can be formed as a flat surface perpendicular to a straight line (120b) extending in the front-rear direction of the holder 100 as shown in FIG. 9, when the circular arc surface portion 125 is formed as in the above example, a decrease in the strength of the cutting tool holder 100 can be prevented, and thus the circular arc surface portion 125 is also effective for prevention of occurrence of chatter.

The recess surface portion 123 having a shape when seen from the lateral flank 120 side may be changed as appropriate in accordance with the cutting tip 200 to be used, a processing condition, and the like. In the above example, the "frontward-facing surface 125" in the recess surface portion 123 is formed so as to extend from the rake face 105 of the holder 100 toward the surface opposite to the rake face 105 and be perpendicular to the straight line (120b) extending in the front-rear direction of the holder 100 (see FIGS. 3 and 7). However, in the case of use under a processing condition that the outer diameter of a to-be cut object that is an object to be processed is limited to a small diameter, as shown by an alternate long and two short dashes line in FIG. 7, the frontward-facing surface 125 may be formed in a circular arc shape at the opposite surface so as to extend toward the front side.

Figure 10:
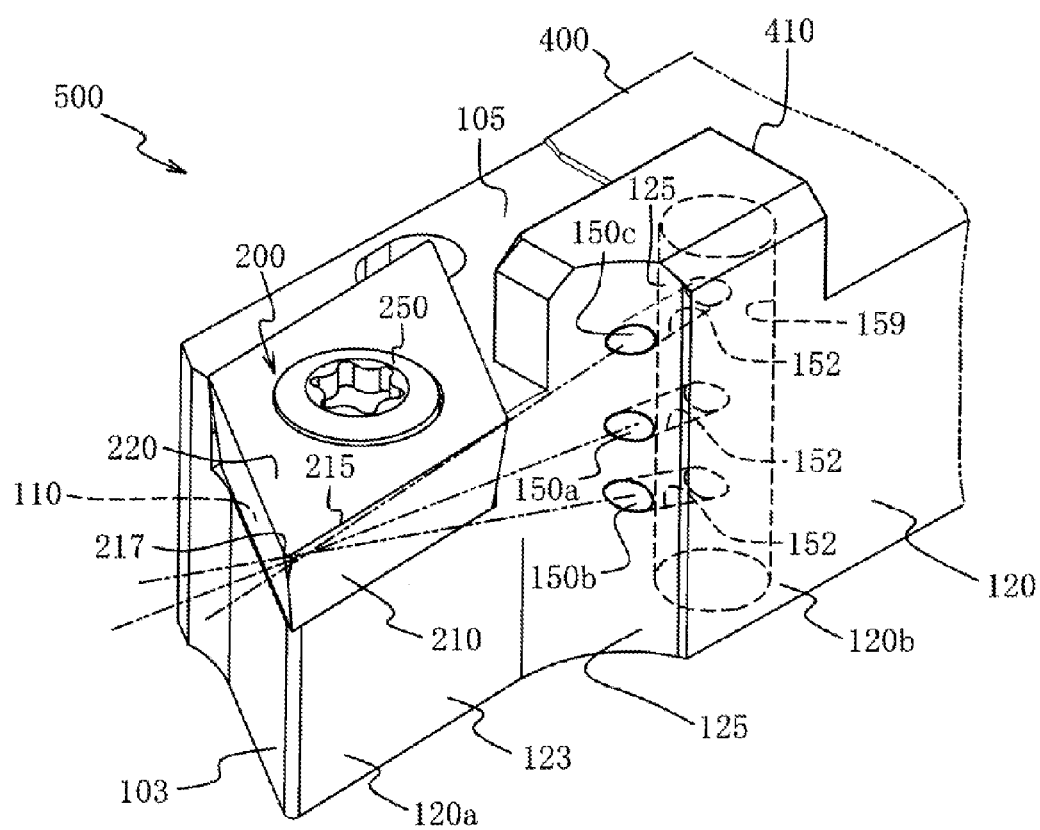
FIG. 10 Enlarged perspective view of a main part of another embodiment of the cutting tool holder and the cutting tool of the present invention.

In the above example, the embodiment where the one ejection port 150 is provided has been described. However, as shown in FIG. 10, a plurality of the ejection ports may be provided vertically. In a holder 400 shown in FIG. 10, a protruding portion 410 is provided on the rake face 105 so as to be formed in a bulging shape, and the recess surface portion 123 is continuous vertically also at the frontward-facing surface 125 of the protruding portion 410, and the shape of the recess surface portion 123 as seen from the rake face 105 side is the same as the shape in FIG. 2. This example is different from the above example only in points regarding the coolant ejection port such as ejection ports 150a, 150b, and 150c being formed vertically at three locations in the frontward-facing surface 125, and there is no difference therebetween regarding the above-described effect due to no protruding portion being present at the lateral flank 120 of the cutting tool holder 400. Therefore, only the differences regarding the ejection port will be described, the same portions or corresponding portions are designated by the same reference numerals, and the description thereof is omitted. Hereinafter, the same applies to the other examples.

Specifically, in this example, the intermediate ejection port 150a is opened in the frontward-facing surface 125, which is formed in the recess surface portion 123 as described above, and at the substantially same height as the tip seat 110 which height is the same as in the above example. The lower ejection port 150b and the upper ejection port 150c are opened below and above the ejection port 150a, respectively. The nozzle-like hole 152 that is continuous rearward from any of the ejection ports and determines the coolant ejection direction is formed such that the axial line thereof (the axial line of the hole) extends at the lateral flank 210 side toward the cutting edge 215 or its front end (knife edge corner) 217 in the cutting tip 200 fixed to the tip seat 110, and the coolant is supplied along the axial line. The upper ejection port 150c is set such that the center thereof is at substantially the same height as the rake face 220 of the cutting tip 200. Thus, in this example, since the center of each ejection port is located as described above, the coolant is supplied from each ejection port toward the cutting edge corner 217 at the lateral flank 120 side of the cutting edge 215, which serves to cut, so that the coolant can be supplied in a concentrated manner to the cutting part from a multi-lateral direction.

In the case where a plurality of ejection ports are provided vertically as in this example, a vertical hole 159 that communicates with the nozzle-like holes 152 of the respective ejection ports may be cut from the rake face 105 side toward a bottom surface in the cutting tool holder 400 or in the opposite direction, and may be closed, for example, by screwing a plug into an end of the vertical hole 159. In FIG. 10, the case where the protruding portion 410 is provided so as to bulge at the rake face 105 side of the cutting tool holder 400 and the recess surface portion 123 is formed so as to include the protruding portion 410 has been described. Even if a plurality of ejection ports are provided, the plurality of ejection ports can be provided vertically also in the holder 100 in FIG. 1 without providing such a protruding portion 410.

Figure 11:
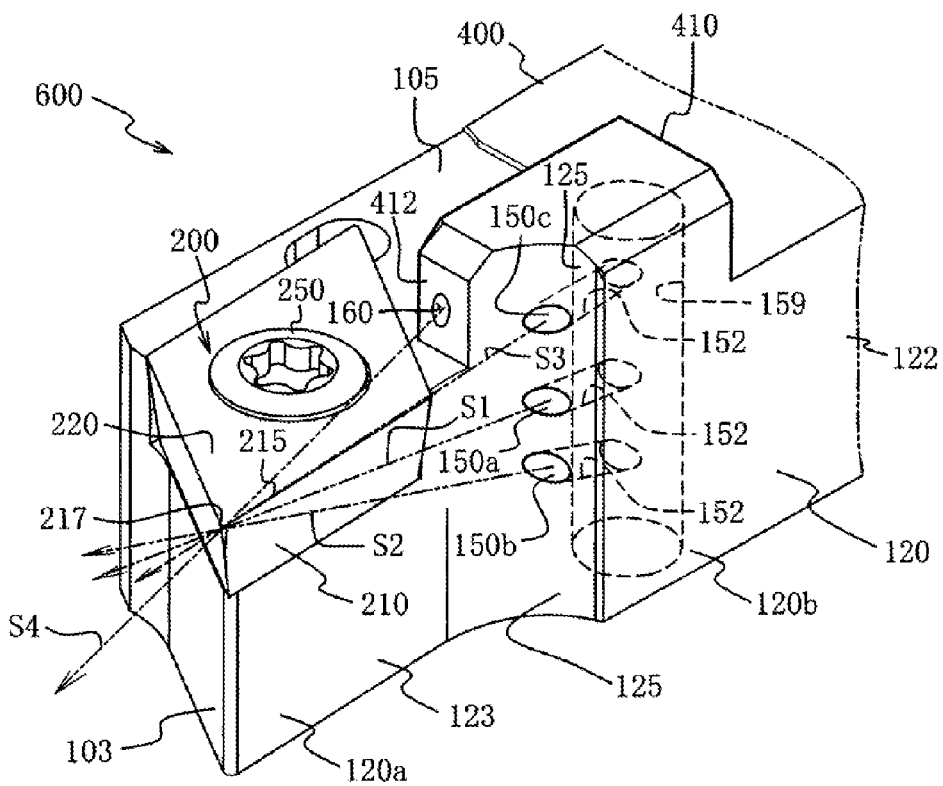
FIG. 11 Enlarged perspective view of a main part of another embodiment of the cutting tool holder and the cutting tool of the present invention.
Figure 12:
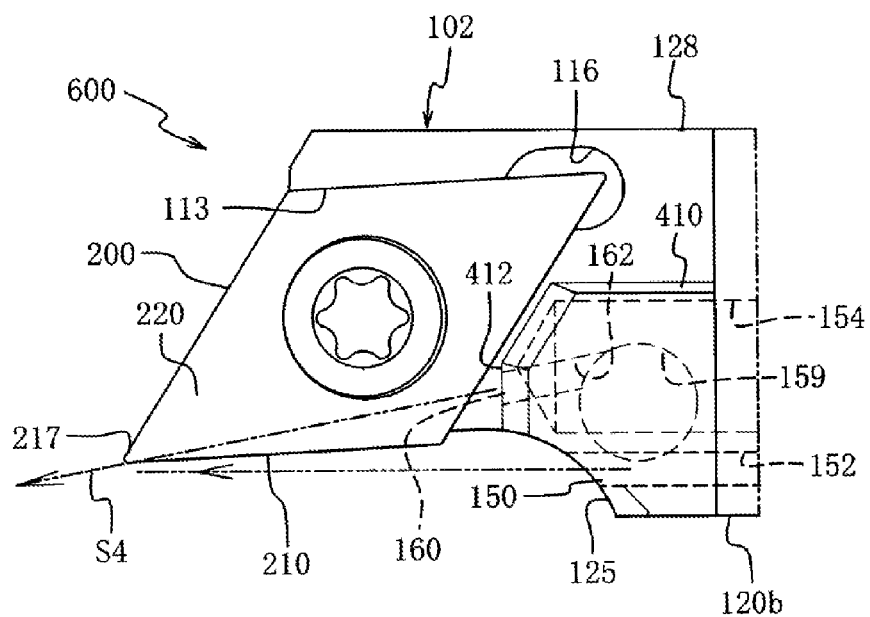
FIG. 12 View of the cutting tool in FIG. 11 as seen from the rake face side.

In the case where the protruding portion 410 is provided so as to bulge as in the above example, a coolant ejection port 160 may be additionally provided in a front end surface 412 of the bulging portion 410 as shown in FIGS. 11 and 12. That is, as in a cutting tool 600 shown as another example in FIGS. 11 and 12, the other ejection port 160 may be provided in the front end surface 412 of the protruding portion 410 that bulges, in the above-described holder 400 in FIG. 10. With this configuration, the coolant is ejected obliquely downward in a jet flow manner from the ejection port 160 toward the front end (knife edge corner) 217 of the cutting edge 215 at the rake face 220 side of the cutting tip 200. The other ejection port 160 in FIGS. 11 and 12 is opened at a position (level) higher than the rake face 105 of the holder 400 and at a position inward (at the upper side in FIG. 12) of the lateral flank 120 and the recess surface portion 123 of the holder 400 when seen from the rake face 105 side (see FIG. 12). The ejection port 160 is formed such that the coolant ejected therefrom is sprayed and supplied obliquely downward toward the front end (knife edge corner) 217 of the cutting edge 215 so as to pass over the rake face 220 of the cutting tip 200 as shown by an alternate long and two short dashes line S4 in FIGS. 11 and 12.

Thus, in this example, during cutting, in addition to the coolant ejected from the ejection ports 150a, 150b, and 150c, which are provided vertically at three locations in the circular arc surface portion (frontward-facing surface) 125 that forms the frontward-facing surface on the rear of the recess surface portion 123, as in a cutting tool 500 shown in FIG. 10, toward the front end (knife edge corner) 217 of the cutting edge 215 at the lateral flank 210 side of the cutting tip 200 as shown by alternate long and two short dashes lines S1, S2, and S3 in FIG. 11, the coolant is also supplied toward the front end (knife edge corner) 217 of the cutting edge 215 so as to pass over the rake face 220 as shown by the alternate long and two short dashes line S4, so that a further preferable swarf treatment effect is obtained. A nozzle-like hole 162 connected to the additionally provided ejection port 160 may be provided such that the coolant is ejected in a direction along the alternate long and two short dashes line S4, and may be formed so as to communicate with the vertical hole 159.

Figure 13:
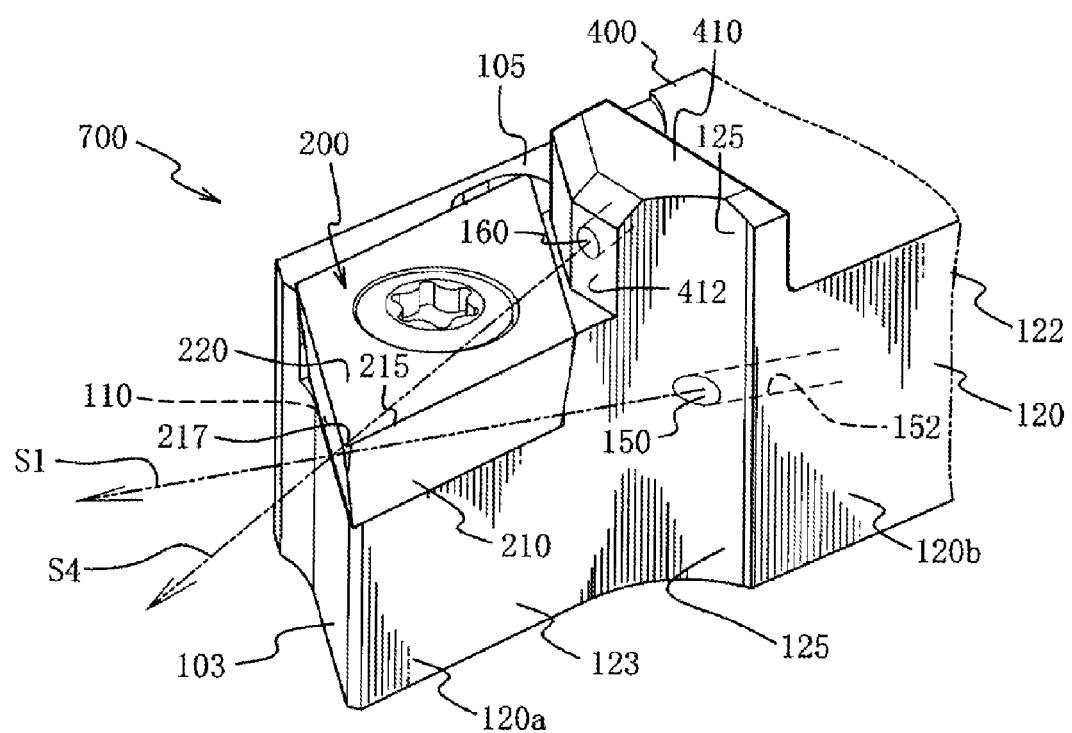
FIG. 13 Enlarged perspective view of a main part of another embodiment of the cutting tool holder and the cutting tool of the present invention.
Figure 14:
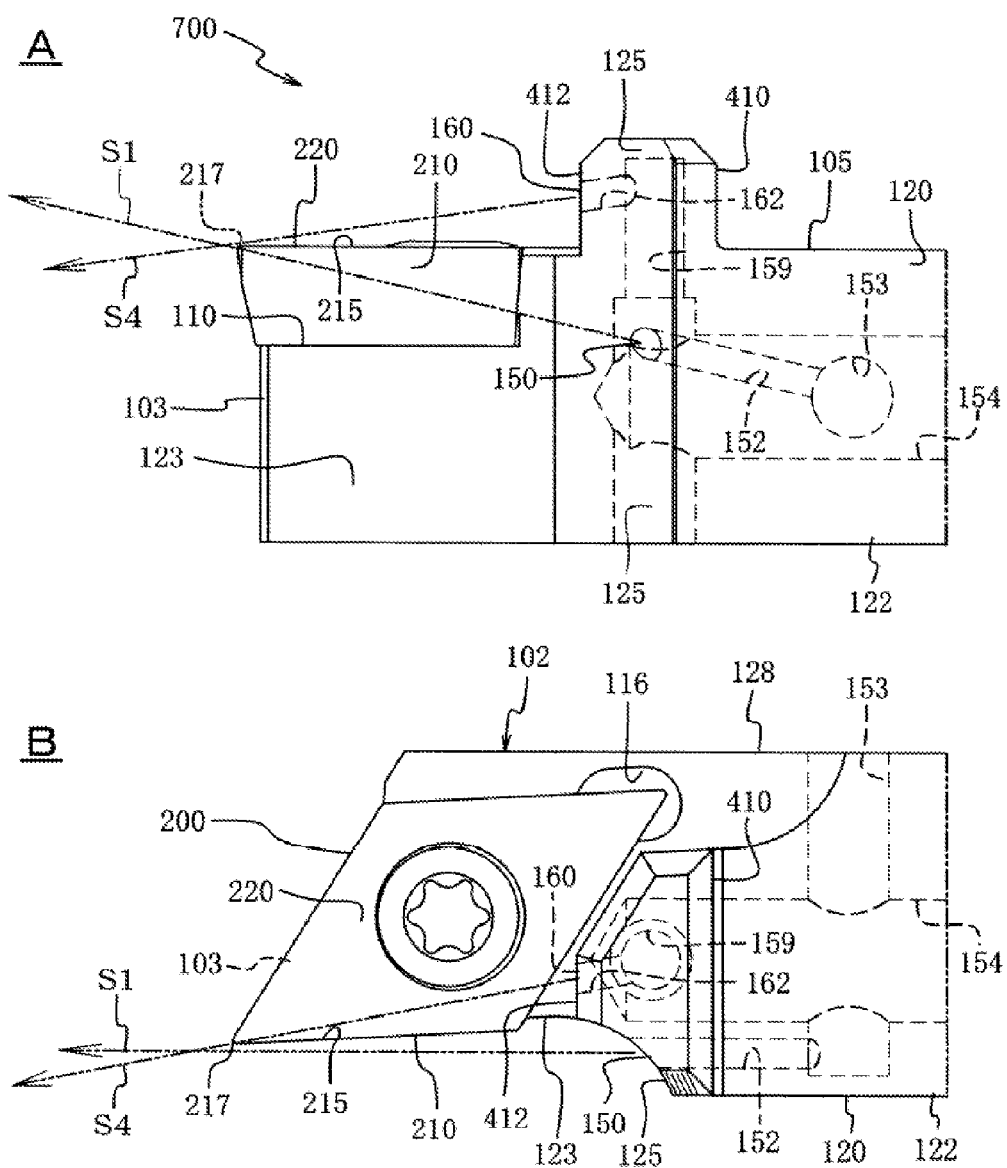
FIG. 14 A is a view of the cutting tool in FIG. 13 as seen from the lateral flank side, and B is a view of the cutting tool in FIG. 13 as seen from the rake face side.

Even in the case where the ejection port 160 is opened in the front end surface 412 of the formed protruding portion 410 so that the coolant is supplied toward the front end (knife edge corner) 217 of the cutting edge 215 so as to pass over the rake face 220 as in the above example, the ejection port 150 opened in the frontward-facing surface 125 such that the coolant is supplied toward the front end (knife edge corner) 217 of the cutting edge 215 at the lateral flank 210 side of the cutting tip 200 may be formed, as in a cutting tool 700 shown in FIGS. 13 and 14, at one location similarly as in the embodiment shown in FIGS. 1 to 4, that is, only in a portion corresponding to the ejection port 150a at the intermediate height shown in FIGS. 10 and 11, may be formed in any of the locations shown in FIGS. 10 and 11, or may be formed at two locations selected as appropriate from the locations shown in FIGS. 10 and 11. In FIG. 13, the protruding portion 410 is made shorter in dimension in the front-rear direction than that in FIG. 11. As described above, the protruding portion 410 may be formed as appropriate such that the ejection port 160 from which the coolant can be ejected in a desired direction and the nozzle-like hole 162 connected thereto are provided therein. In the case where the ejection port 150 provided in the frontward-facing surface 125 of the recess surface portion 123 is provided, as shown in FIGS. 13 and 14, only as the ejection port 150a at the intermediate height in FIGS. 10 and 11, the nozzle-like hole 152 connected to the ejection port 150 may be caused to communicate with the branch flow path 153, the main flow path 154 in the above example may be provided so as to extend toward the front end side, the vertical hole 159 may be provided so as to extend upward at the front end of the main flow path 154, and the nozzle-like hole 162 provided in the front end surface 412 of the protruding portion 410 and connected to the ejection port 160 may be provided so as to communicate with the vertical hole 159. The flow paths such as each nozzle-like hole through which the coolant passes may be formed so as to communicate with each other within the holder 400 as appropriate such that the coolant fed under pressure in the main flow path 154 is ejected from each ejection port, and an unnecessary opening may be closed (plugged) with a screw-in-type plug or the like, although not shown.

In the above example, the cutting tool holder is embodied as one for fixing the cutting tip composed of the rhomboidal tip. As a matter of course, the present invention is applicable to one using a cutting tip having a polygonal shape such as a triangular shape. In addition, although the cutting tool is embodied as one using a screw-fastening-type clamp means for fixing itself, the cutting tool may be embodied, for example, as a clamp type one that is pressed additionally with a press fitting. The recessed dimension (depression width L2) of the recess surface portion from the reference surface in the cutting tool holder according to the present invention may be set as appropriate in accordance with the projection amount, toward the lateral flank side, of the cutting edge corner of the cutting tip to be fixed, or another processing condition, such that the frontward-facing surface in which the ejection port can be provided can be formed on the rear of the recess surface portion. However, preferably, the recessed dimension is set such that, when the cutting tip is fixed, the cutting edge corner, which serves to cut, does not project outward (to the lateral flank side) from the reference surface as seen from the rake face side, and the coolant can be ejected to the cutting edge, which serves to cut, at the lateral flank side. The shapes and the numbers of the coolant ejection ports and the flow paths connected thereto are not limited, and, for example, the coolant ejection ports and the flow paths connected thereto may not be holes having a circular transverse cross-section. Therefore, the ejection port can be embodied as one having an appropriate shape, and, for example, may be opened as a slit-like one extending vertically.

DESCRIPTION OF REFERENCE NUMERALS 100, 400: cutting tool holder
102: front end portion of holder
103: front end of holder
105: rake face of holder
110: tip seat
120: lateral flank of holder
122: rear portion rearward of predetermined range
123: recess surface portion
125: frontward-facing surface (circular arc surface portion) in recess surface portion
150, 150a, 150b, 150c: ejection port
200: cutting tip
210: lateral flank of cutting tip
215: cutting edge of cutting tip
220: rake face of cutting tip
300, 500, 600, 700: cutting tool
L1: predetermined range from front end toward rear end L2: virtual straight line drawn along lateral flank in rear portion of holder

The invention claimed is:

1. A cutting tool holder comprising:
a tip seat, provided in a front end portion of the cutting tool holder, for fixing a cutting tip thereto, and including a restraining wall positioned from a front end of the tip seat toward a rear end of the tip seat opposite a lateral flank side of the cutting tool holder; and
an ejection port opened to provide coolant from a lateral flank side of the cutting tip toward a cutting edge of the cutting tip fixed to the tip seat, the ejection port being provided at the lateral flank side of the cutting tool holder such that the cutting tip is positioned between the restraining wall and the ejection port, wherein
a recess surface portion is formed in a predetermined range from a front end toward a rear end, of a lateral flank of the front end portion of the cutting tool holder, so as to be recessed relative to a lateral flank of a rear portion rearward of the predetermined range, and
the ejection port is provided in a frontward-facing surface in the recess surface portion and is opened such that, when the cutting tip is fixed to the tip seat, the ejection port is located at a position lower than a rake face of the cutting tip and the coolant is ejected obliquely upward.

2. The cutting tool holder according to claim 1, wherein a plurality of the ejection port is provided in an up-down direction.

3. A cutting tool comprising:
the cutting tool holder according to claim 1; and
the cutting tip fixed to the tip seat of the cutting tool holder, wherein, when seen from a rake face side, the cutting tip does not project from a virtual straight line that is drawn along the lateral flank of the rear portion in the cutting tool holder.

* * * * *